(12) United States Patent
Kudo (10) Patent No.: US 11,754,526 B2
(45) Date of Patent: Sep. 12, 2023

(54) METHOD OF EVALUATING ANALYSIS DEVICE, METHOD OF CALIBRATING ANALYSIS DEVICE, ANALYSIS METHOD, ANALYSIS DEVICE AND NON-TRANSITORY COMPUTER READABLE MEDIUM

(71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 288 days.

(21) Appl. No.: 17/312,500

(22) PCT Filed: Dec. 17, 2018

(86) PCT No.: PCT/JP2018/046378
§ 371 (c)(1),
(2) Date: Jun. 10, 2021

(87) PCT Pub. No.: WO2020/129129
PCT Pub. Date: Jun. 25, 2020

(65) Prior Publication Data
US 2022/0050080 A1 Feb. 17, 2022

(51) Int. Cl.
*G01N 27/64* (2006.01)
*H01J 49/00* (2006.01)
*H01J 49/04* (2006.01)
*G01N 27/62* (2021.01)

(52) U.S. Cl.
CPC ............. *G01N 27/64* (2013.01); *G01N 27/62* (2013.01); *H01J 49/0009* (2013.01); *H01J 49/0031* (2013.01); *H01J 49/0422* (2013.01); *H01J 49/0431* (2013.01)

(58) Field of Classification Search
CPC ........ G01N 27/64; G01N 27/62; G01N 30/86; H01J 49/0009; H01J 49/0031; H01J 49/0422; H01J 49/0431
USPC .................................................. 250/281, 282
See application file for complete search history.

(56) References Cited

FOREIGN PATENT DOCUMENTS

WO WO-2020066009 A1 * 4/2020 ......... G01N 30/7206

OTHER PUBLICATIONS

"IEC 62321-6/Ed.1 Determination of Certain Substances in Electrotechnical Products—Part 6: Polybrominated biphenyls and polybrominated diphenyl ethers in polymers by gas chromatography-mass spectrometry (GC-MS)", Ed.1, the International Electrotechnical Commission, 2015, 57 pages.

(Continued)

*Primary Examiner* — Michael Maskell
(74) *Attorney, Agent, or Firm* — Sughrue Mion, PLLC (57) ABSTRACT

A method of evaluating an analysis device that is capable of detecting each of a plurality of compounds included in a sample includes introducing the sample including a first compound into the analysis device for measurement and detecting the first compound and at least one reaction product derived from the first compound, and acquiring information representing whether the analysis device is in a suitable state for an analysis based on an intensity of the detected first compound and an intensity of each of the detected at least one reaction product, and a relative response factor in regard to each of the first compound and the at least one reaction product.

15 Claims, 4 Drawing Sheets

(56) References Cited

OTHER PUBLICATIONS

International Search Report of PCT/JP2018/046378 dated Mar. 19, 2019 [PCT/ISA/210].
Written Opinion of PCT/JP2018/046378 dated Mar. 19, 2019 [PCT/ISA/237].

* cited by examiner

FIG. 1A  PRIOR ART

Decabromodiphenyl ether

FIG. 1B

Nonabromodiphenyl ether

FIG. 1C

Octabromodiphenyl ether

METHOD OF EVALUATING ANALYSIS DEVICE, METHOD OF CALIBRATING ANALYSIS DEVICE, ANALYSIS METHOD, ANALYSIS DEVICE AND NON-TRANSITORY COMPUTER READABLE MEDIUM

CROSS REFERENCE TO RELATED APPLICATIONS

This application is a National Stage of International Application No. PCT/JP2018/046378 filed on Dec. 17, 2018.

TECHNICAL FIELD

The present invention relates to a method of evaluating an analysis device, a method of calibrating the analysis device, an analysis method, the analysis device and a non-transitory computer readable medium storing a chromatographic control program.

BACKGROUND ART

In a case where an analysis device such as a mass spectrometer is not in a suitable state for performing an analysis, an introduced specific compound may be decomposed unintentionally, and an amount of the compound in a sample to be analyzed, a compound produced by decomposition or the like may not be measured appropriately. For example, as for Decabromodiphenyl ether (Deca-BDE) which is a flame retardant, a reaction product produced by decomposition due to contamination or deterioration of a mass spectrometer is detected in mass spectrometry. This reaction product is Nonabromodiphenyl ether (Nona-BDE) that is obtained when one bromine is desorbed from Deca-BDE, Octabromodiphenyl ether (Octa-BDE) that is obtained when two bromines are desorbed from Deca-BDE or the like (see FIGS. 1A to 3C).

Therefore, before a sample to be analyzed is analyzed, Deca-BDE is introduced into an analysis device as an evaluation compound, and Deca-BDE and the above-mentioned reaction product are detected. Further, whether the analysis device is a suitable state for performing an analysis is evaluated (see Non-Patent Document 1).

CITATION LIST

Non-Patent Document

[Non-Patent Document 1] International Electrotechnical Commission, "DETERMINATION OF CERTAIN SUBSTANCES IN ELECTROTECHNICAL PRODUCTS—Part 6: Polybrominated biphenyls and polybrominated diphenyl ethers in polymers by gas chromatography-mass spectrometry (GC-MS)," First edition, (the Swiss Confederation), International Electrotechnical Commission, June 2015, p. 22-23

SUMMARY OF INVENTION

Technical Problem

With the above-mentioned conventional method of evaluating an analysis device, it was necessary to perform complicated operations such as creating a calibration curve in advance in regard to each of an evaluation compound and a reaction product, separately measuring a standard sample of the evaluation compound and a standard sample of the reaction product, etc. in order to prevent degradation of accuracy of evaluation.

Solution to Problem

According to a first aspect of the present invention, a method of evaluating an analysis device that is capable of detecting each of a plurality of compounds included in a sample includes introducing the sample including a first compound into the analysis device for measurement and detecting the first compound and at least one reaction product derived from the first compound, and acquiring information representing whether the analysis device is in a suitable state for an analysis based on an intensity of the detected first compound and an intensity of each of the detected at least one reaction product, and a relative response factor in regard to each of the first compound and the at least one reaction product.

According to a second aspect of the present invention, in the method of evaluating an analysis device of the first aspect, the information is preferably acquired based on a ratio between the intensity of the detected first compound and the intensity of each of the detected at least one reaction product, and the relative response factor.

According to a third aspect of the present invention, in the method of evaluating an analysis device of the first or second aspect, a proportion in which the first compound has been changed to the reaction product is preferably calculated based on the intensity of the first compound and the intensity of each of the at least one reaction product, and the relative response factor.

According to a fourth aspect of the present invention, in the method of evaluating an analysis device of the third aspect, the information representing whether the analysis device is in a suitable state for an analysis is preferably acquired based on whether the proportion satisfies a condition based on a predetermined threshold value.

According to a fifth aspect of the present invention, the method of evaluating an analysis device of the third or fourth aspect preferably includes displaying a graph showing a change of the proportion over time.

According to a sixth aspect of the present invention, in the method of evaluating an analysis device of any one of the third to fifth aspects, letting an intensity of the first compound be $A'_S$, letting an intensity of a k-th reaction product be $A'_{Pk}$ in a case where n is the number of types of a reaction product and k is a natural number (k is an integer that is equal to or larger than 1 and equal to or smaller than n) and letting a relative response factor of the first compound with respect to the k-th reaction product be $RRF_{S/Pk}$, the proportion (Pr) is preferably expressed by the formula (A) in the below-mentioned embodiment.

According to a seventh aspect of the present invention, the method of evaluating an analysis device of any one of the first to sixth aspects preferably includes outputting a notification in a case where the analysis device is at least not in a suitable state for an analysis.

According to an eighth aspect of the present invention, in the method of evaluating an analysis device of any one of first to seventh aspects, an absolute concentration of the first compound or the reaction product is preferably not quantitatively analyzed.

According to a ninth aspect of the present invention, in the method of evaluating an analysis device of any one of the first to eighth aspects, the analysis device preferably includes at least one of a mass spectrometer and a chromatograph.

According to a tenth aspect of the present invention, in the method of evaluating an analysis device of the ninth aspect, wherein the analysis device is preferably a gas chromatograph-mass spectrometer, a pyrolysis gas chromatograph-mass spectrometer, a gas chromatograph, a liquid chromatograph, a liquid chromatograph-mass spectrometer or an ion attachment mass spectrometer.

According to an eleventh aspect of the present invention, a method of calibrating an analysis device includes evaluating an analysis device by the method of evaluating an analysis device of any one of the first to tenth aspects, and calibrating the analysis device based on the evaluation.

According to a twelfth aspect of the present invention, an analysis method includes evaluating an analysis device by the method of evaluating an analysis device of any one of the first to tenth aspects, and performing an analysis using the evaluated analysis device.

According to a thirteenth aspect of the present invention, in the analysis method of the twelfth aspect, data obtained by the analysis device is preferably corrected based on the information.

According to a fourteenth aspect of the present invention, an analysis device is capable of detecting each of a plurality of compounds included in a sample, and includes a measurer that introduces the sample including a first compound into the analysis device for measurement and detects the first compound and at least one reaction product derived from the first compound, and a device information acquirer that acquires information representing whether the analysis device is in a suitable state for an analysis based on an intensity of the detected first compound and an intensity of each of the detected at least one reaction product, and a relative response factor in regard to each of the first compound and the at least one reaction product.

According to a fifteenth aspect of the present invention, a non-transitory computer readable medium stores a program, and a program causes a processing device to execute a measurement data acquisition process of introducing a sample including a first compound into an analysis device that is capable of detecting each of a plurality of compounds included in the sample for measurement and acquiring measurement data obtained by detection of the first compound and at least one reaction product derived from the first compound, and a device information acquisition process of acquiring information representing whether the analysis device is in a suitable state for an analysis based on an intensity of the detected first compound and an intensity of each of the detected at least one reaction product, and a relative response factor in regard to each of the first compound and the at least one reaction product.

Advantageous Effects of Invention

With the present invention, whether an analysis device is in a suitable state for an analysis can be evaluated without a complicated operation.

DESCRIPTION OF EMBODIMENTS

Embodiments of the present invention will be described below with reference to the drawings.

First Embodiment

With a method of evaluating an analysis device of the present embodiment, an evaluation compound is introduced into the analysis device for measurement, and the evaluation compound and at least one reaction product derived from the evaluation compound are detected. Thereafter, information about whether the analysis device is in a suitable state for an analysis is obtained based on an intensity of each of the detected evaluation compound and the above-mentioned at least one reaction product, and a relative response factor in regard to each of the evaluation compound and the above-mentioned at least one reaction product.

(Regarding Evaluation Compound)

An evaluation compound is a compound that is introduced into an analysis device as a sample for evaluation of the analysis device and used for measurement. As long as at least one reaction product derived from an evaluation compound may be produced by an analysis performed by an analysis device, the evaluation compound is not limited in particular. Here, a reaction product is a product that is produced in a case where an evaluation compound is to be detected in an analysis performed by an analysis device and is a molecule that affects accuracy of detection of the evaluation compound (hereinafter, in a case where being simply mentioned, a "reaction product" refers to the molecule) when being produced. A reaction product is a molecule that is produced unintentionally in an analysis of an evaluation product performed by an analysis device. Here, "detection" of an evaluation compound or a reaction product refers to detection for quantitatively analyzing these molecules included in a sample, and includes directly detecting substances derived from these molecules such as an ionized molecule, a dissociated molecule or a derivative of a molecule and also includes not directly detecting these molecules.

An evaluation compound is preferably a molecule with which an amount of a reaction product produced in an analysis of the evaluation compound performed by an analysis device is increased in a case where the analysis device is contaminated or deteriorated. Thus, contamination or deterioration of an analysis device can be detected with the method of evaluating an analysis device of the present embodiment, and an analysis with low accuracy can be avoided.

At least one of an evaluation compound and a reaction product derived from the evaluation compound is preferably a chemical substance that is manufactured and distributed industrially, and is more preferably a regulated substance that is subject to regulation due to impact on living creatures such as humans or impact on environment. In a case where the structure of an evaluation compound or a reaction product is the same as or similar to that of a compound to be analyzed, accuracy of evaluation is enhanced. Therefore, while the number of chemical substances that are subject to regulation is increased, and an accurate quantitative analysis is becoming increasingly important, in a case where the above-mentioned chemical substance or regulated substance is analyzed by an analysis device, it is possible to obtain more accurate information about whether the analysis device is in a suitable state for the analysis by performing the method of evaluating an analysis device of the present embodiment in advance.

Preferably, an evaluation compound is Deca-BDE, and a reaction product is at least one of Polybrominated diphenyl ether (PBDE) excluding Deca-BDE. Thus, information about whether an analysis device is in a suitable state for the analysis can be obtained before an important analysis of molecules such as Deca-BDE that is manufactured and distributed industrially as a flame retardant, a regulated PBDE or a PBDE that is to be regulated. A reaction product is more preferably at least one of Nona-BDE and Octa-BDE. Thus, the above-mentioned information can be obtained more accurately with the use of a reaction product that is likely to be produced when Deca-BDE is analyzed.

Figure 1A:
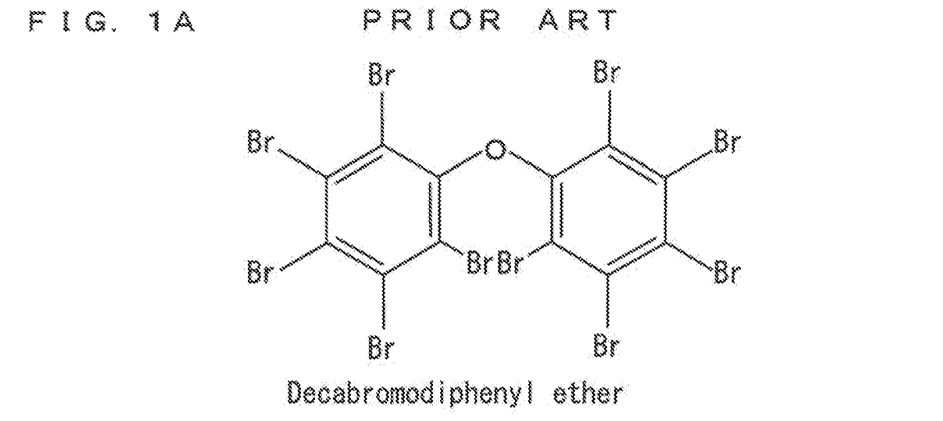
FIG. 1A is a diagram showing the chemical formula of Deca-BDE.
Figure 1B:
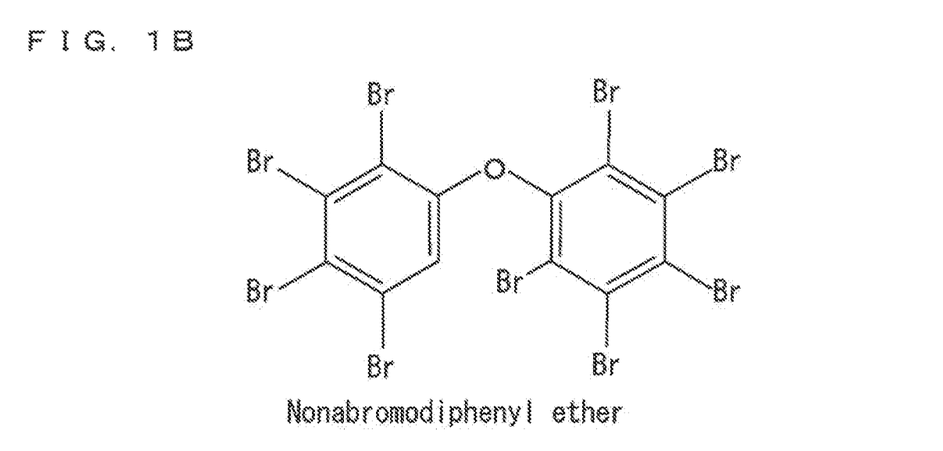
FIG. 1B is a diagram showing the chemical formula of Nona-BDE and FIG. 1C is a diagram showing the chemical formula of Octa-BDE.
Figure 1C:
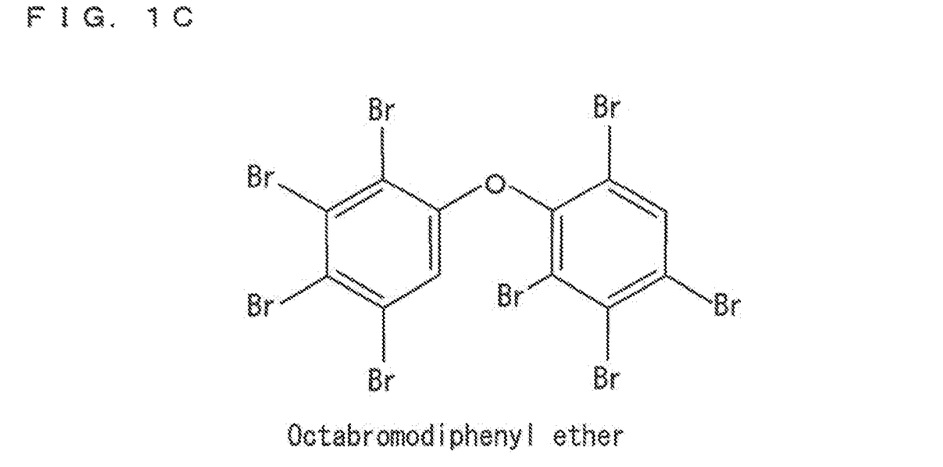

FIGS. 1A, 1B and 1C respectively show the chemical formulas of Deca-BDE, Nona-BDE and Octa-BDE. Nona-BDE is a molecule that is obtained when one bromine is desorbed from Deca-BDE, and Octa-BDE is a molecule obtained when two bromines are desorbed from Deca-BDE. In the below-mentioned embodiment, positions in Nona-BDE and Octa-BDE at which bromines are desorbed are not limited in particular.

(Regarding Analysis Subject)

The method of evaluating an analysis device in the present embodiment can be performed before an analysis of any molecule to be analyzed is analyzed with the use of the analysis device. As described above, although preferably including a chemical substance that is manufactured and distributed industrially or a regulated substance subject to regulation due to impact on living creatures such as humans or impact on environment, an molecule to be analyzed is not limited in particular. A molecule to be analyzed is preferably at least one type of PBDE, and is more preferably at least one out of a group including Deca-BDE, Nona-BDE and Octa-BDE.

(Regarding Analysis Device)

Figure 2:
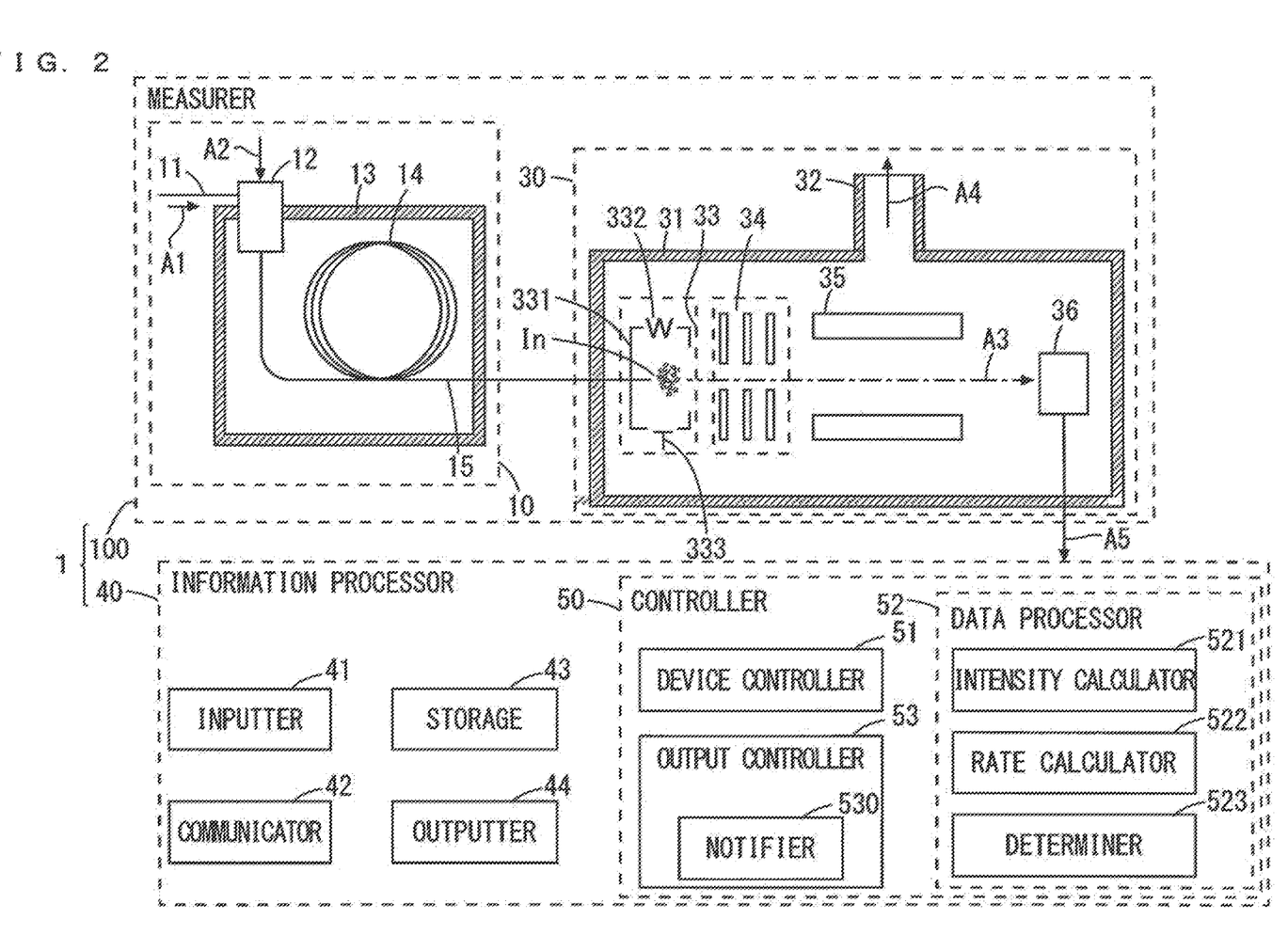
FIG. 2 is a conceptual diagram showing the configuration of an analysis device according to one embodiment.

FIG. 2 is a conceptual diagram showing the configuration of an analysis device according to the present embodiment. The analysis device 1 includes a gas chromatograph-mass spectrometer (hereinafter referred to as a GC-MS) and includes a measurer 100 and an information processor 40. The measurer 100 includes a gas chromatograph 10 and a mass spectrometry unit 30.

As long as the analysis device of the present embodiment can detect each of a plurality of compounds included in a sample, and a reaction product derived from an evaluation compound may be produced when the evaluation compound is analyzed, the analysis device of the present embodiment is not limited in particular. The analysis device may be a chromatograph such as a gas chromatograph (GC) or a liquid chromatograph, a mass spectrometer that includes a chromatograph such as a pyrolysis gas chromatograph-mass spectrometer (Py-GC-MS) or a liquid chromatograph-mass spectrometer (hereinafter referred to as an LC-MS), or an ion attachment mass spectrometer or another mass spectrometer not including a chromatograph. In regard to a molecule such as Deca-BDE, when an amount of a contaminated portion or an oxidized portion is increased in a glass insert of a gas chromatograph, a column of a chromatograph, an ionization chamber of an ion attachment mass spectrometer or the like, an amount of a reaction product that is produced by decomposition with the portions used as reaction sites is increased. Therefore, the present invention can be suitably applied to these devices.

The gas chromatograph 10 includes a carrier gas flow path 11, a sample introducer 12 into which a sample to be analyzed or an evaluation component (hereinafter referred to as a "sample or the like") is introduced, a column temperature adjuster 13, a separation column 14 and a sample gas introduction tube 15. The mass spectrometry unit 30 includes a vacuum container 31, an exhaust port 32, an ionizer 33 that ionizes a sample or the like and produces ions In, an ion adjuster 34, a mass separator 35 and a detector 36. The ionizer 33 includes an ionization chamber 331, a thermion generating filament 332 and a trapping electrode 333.

The information processor 40 includes an inputter 41, a communicator 42, a storage 43, an outputter 44 and a controller 50. The controller 50 includes a device controller 51, a data processor 52 and an output controller 53. The data processor 52 includes an intensity calculator 521, a rate calculator 522 and a determiner 523. The output controller 53 includes a notifier 530.

The measurer 100 separates a sample or the like into components by a separation analysis and detects the sample or the like.

The gas chromatograph 10 separates a sample or the like into components based on physical properties or chemical properties. A sample or the like is gas or gaseous when being introduced into the separation column 14 and is referred to as a sample gas.

The carrier gas flow path 11 is a flow path for a carrier gas such as helium and introduces the carrier gas into the sample introducer 12 (arrow A1). The sample introducer 12 includes a chamber such as a sample vaporization chamber into which a sample or the like is introduced, temporarily contains the sample or the like injected by an injector (not shown) such as a syringe or an autosampler, vaporizes the sample or the like in a case where the sample or the like is liquid and introduces a sample gas into the separation column 14 (arrow A2). A method of introducing a sample or the like is not limited, and a splitless introduction method, a split introduction method or the like can be suitably used.

The separation column 14 includes a column such as a capillary column. The temperature of the separation column 14 is controlled at several hundred ° C. or less by the column temperature adjuster 13 including a column oven or the like. A sample gas is separated into components based on a distribution coefficient between a mobile phase and a stationary phase of the separation column 14, etc., and components into which the sample gas is separated are respectively eluted from the separation column 14 at different times and introduced into the ionization chamber 331 of the mass spectrometry unit 30 through the sample gas introduction tube 15.

The mass spectrometry unit 30 includes a mass spectrometer, ionizes a sample or the like that has been introduced into the ionizer 33 and detects the sample or the like by mass separation. A path through which ions In produced by the ionizer 33 flow is schematically indicated by the arrow A3.

A method of detecting a sample or the like eluted from a chromatograph is not limited in particular as long as an intensity of an evaluation component and a reaction product can be acquired, and an absorbance detector or the like may be used. Further, in the following description, a single quadrupole mass spectrometer that performs mass separation by using one quadrupole mass filter is used as the mass spectrometry unit 30, byway of example. However, as long as being able to detect ions In corresponding to a sample or the like with desired accuracy by mass spectrometry, the type of a mass spectrometer that constitutes the mass spectrometry unit 30 is not limited in particular. The mass spectrometer may be a tandem mass spectrometer or a multi-stage spectrometer.

The vacuum container 31 of the mass spectrometry unit 30 includes the exhaust port 32. The exhaust port 32 is connected to a vacuum exhaust system (not shown) that includes a pump such as a turbo-molecular pump that can realize a high vacuum state such as $10^{-2}$ Pa or less and its auxiliary pump. In FIG. 2, the position at which gas in the vacuum container 31 is exhausted is indicated schematically by the arrow A4.

The ionizer 33 of the mass spectrometry unit 30 includes an ion source and ionizes a sample or the like introduced into the ionizer 33 by electronic ionization. The ionizer 33 accelerates a thermion produced in the thermion generating filament 332 at a voltage such as several tens of eV applied to the trapping electrode 333 and irradiates a sample or the like in the ionization chamber 331 with the thermion to produce ions In. Because a sample or the like is dissociated when being ionized, the ions In include fragment ions obtained by dissociation of the sample or the like. The ions In produced by the ionizer 33 are introduced into the ion adjuster 34.

An ionization method performed by the ionizer 33 is not limited in particular as long as ionization can be performed with desired efficiency. In case of GC-MS, chemical ionization or the like may be used. In case of LC-MS, an electrospray method or the like can be suitably used.

The ion adjuster 34 of the mass spectrometry unit 30 includes an ion transport system such as a lens electrode or an ion guide and makes adjustment by converging ions In using electromagnetic action, etc. Ions In emitted from the ion adjuster 34 are introduced into the mass separator 35.

The mass separator 35 of the mass spectrometry unit 30 includes a quadrupole mass filter and performs mass separation of introduced ions In. The mass separator 35 causes ions In to pass selectively based on an m/z value by a voltage applied to the quadrupole mass filter. Ions In obtained by mass separation in the mass separator 35 enter the detector 36.

A mass spectrometry apparatus that constitutes the mass separator is not limited in particular, and an ion trap mass spectrometry apparatus, a time-of-flight mass spectrometry apparatus or the like may be used.

The detector 36 of the mass spectrometry unit 30 includes an ion detector and detects entered ions In. The detector 36 converts a detection signal obtained by detection of the entered ions In into a digital signal by an A/D converter (not shown) and outputs the digitalized detection signal to the information processor 40 as measurement data (the arrow A5).

The information processor 40 includes an information processing apparatus such as an electronic calculator and executes processes such as communication, storage, calculation, etc. with regard to various data in addition to serving as an interface with respect to a user (hereinafter simply referred to as a "user") of the analysis device 1.

The information processor 40 may be configured as one device integrated with the measurer 100. Further, part of data used by the analysis device 1 may be saved in a remote server or the like, and part of a calculation process executed by the analysis device 1 may be executed by the remote server or the like.

The inputter 41 is constituted by an input device such as a mouse, a keyboard, various buttons or a touch panel. The inputter 41 receives information and so on required for control of the measurer 100 or a process executed by the controller 50 from the user. The communicator 42 is constituted by a communication device that can communicate via wireless connection such as the Internet or wired communication, and suitably transmits and receives data and so on relating to control of the measurer 100 or a process executed by the controller 50.

The storage 43 is constituted by a non-volatile storage medium and stores measurement data, a program for execution of a process by the controller 50, data required for execution of a process by the data processor 52, data obtained by the process, etc.

In the storage 43, a pre-calculated relative response factor of an evaluation compound with respect to a reaction product is stored. In a case where the number of reaction products to be detected is two or more, a plurality of relative response factors are stored in the storage 43, and each of the plurality of relative response factors corresponds to a relative response factor of each reaction product with respect to an evaluation compound. This relative response factor is obtained when a standard sample of an evaluation compound and a standard sample of at least one reaction product are measured when the analysis device 1 is in a suitable state for an analysis. Further, in the storage 43, a numerical value representing a threshold value (hereinafter referred to as a determination threshold value) for reaction rate determination, described below, is stored.

The outputter 44 is constituted by a display device such as a liquid crystal monitor, a printer or the like. The outputter 44 outputs a notification about determination that the analysis device 1 is not in a suitable state for an analysis by the method of evaluating an analysis device of the present embodiment and data or the like obtained by a process executed by the data processor 52 by displaying the notification and the data or the like in the display device or printing the notification and the data or the like using a printer.

The controller 50 includes a processor such as a CPU, controls behavior of each component of the measurer 100 and processes measurement data.

The device controller 51 of the controller 50 controls behavior of each component of the measurer 100. For example, the device controller 51 can detect ions In in a scan mode in which an m/z of ions passing through the mass separator 35 changes continuously or an SIM (Selective Ion Scanning) mode in which a plurality of ions having a specific m/z pass. In this case, the device controller 51 changes a voltage of the mass separator 35 such that ions In having an m/z that is set based on input from the inputter 41, or the like selectively pass through the mass separator 35. Further, the device controller 51 controls a voltage value or the like of each component of the analysis device 1 in adjustment of sensitivity or calibration such as mass calibration.

The data processor 52 of the controller 50 processes and examines measurement data. The data processor 52 functions as a device information acquirer that acquires information about whether the analysis device 1 is in a suitable state for an analysis from the measurement data and at least one relative response factor stored in the storage 43. In addition, the data processor 52 can perform various examination such as a quantitative analysis of a sample to be analyzed.

The intensity calculator 521 calculates the intensity of a detected evaluation compound and the intensity of at least one detected reaction product from measurement data. In the present embodiment, an "intensity" refers to intensity of a signal obtained by detection. In a case where mass spectrometry is performed in the SIM mode, the intensity calculator 521 calculates an intensity of an evaluation compound or a reaction product corresponding to each set m/z as an intensity detected in correspondence with the m/z. In a case where mass spectrometry is performed in the scan mode, the intensity calculator 521 produces data corresponding to a mass spectrum from measurement data and calculates a peak intensity or a peak area of a peak corresponding to an evaluation compound or a reaction product as the intensity of the evaluation compound or the reaction product.

The rate calculator 522 calculates a rate of change at which an evaluation compound is changed to at least one reaction product (hereinafter referred to as a reaction rate) based on the detected intensity of the evaluation compound, the detected intensity of the at least one reaction product and each relative response factor in regard to the evaluation compound and each reaction product.

<Regarding Calculation of Reaction Rate from Detected Intensity and Relative Response Factor>

Suppose that the number of reaction products is one. Letting a concentration of an evaluation compound S in a sample be $C'_S$, and letting a concentration of a reaction product P in the sample be $C'_P$, a reaction rate Pr is defined by the following formula (1).

$$Pr = C'_P/(C'_S + C'_P) \tag{1}$$

A Relative Response Factor (RRF) of an evaluation compound S with respect to a reaction product P is $RRF_{S/P}$. An RRF is expressed by a rate of a Response Factor (RF) of two compounds. Letting a weight of an analyzed compound be M, and letting the intensity obtained by an analysis be A, an RF is expressed by the following formula (11).

$$RF = A/M \tag{11}$$

Letting a weight of an analyzed evaluation compound S be $M_S$, letting an intensity obtained by an analysis be $A_S$, letting a weight of the analyzed reaction product P be $M_P$, and letting an intensity obtained by an analysis be $A_P$, $RRF_{S/P}$ is expressed by the following formula (12).

$$RRF_{S/P} = (A_S/M_S)/(A_P/M_P) \tag{12}$$

In a case where a concentration of an evaluation compound S used when an $RRF_{S/P}$ is acquired is $C_S$, and a concentration of a reaction product P is $C_P$, when a volume of an analyzed sample is V, $M_S = C_S \times V$, $M_P = C_P \times V$. From this and the above-mentioned formula (12), $RRF_{S/P}$ is defined by the following formula (2).

$$RRF_{S/P} = (A_S/C_S \times V)/(A_P/C_P \times V) = (A_S/C_S)/(A_P/C_P) \tag{2}$$

Here, a relative response factor $RRF_{S/P}$ of the analysis device 1 is constant. In this case, letting an intensity obtained by an analysis of an evaluation compound S of the concentration $C'_P$ be $A'_S$, and letting an intensity obtained by an analysis of a reaction product P of a concentration $C'_P$ be $A'_P$, the following formula (3) holds.

$$RRF_{S/P} = (A_S/C_S)/(A_P/C_P) = (A'_S/C'_S)/(A'_P/C'_P) \tag{3}$$

A reaction rate Pr may be calculated with the use of a relative response factor of a reaction product P with respect to an evaluation compound S. A value of a relative response factor in this case is a reciprocal of the formula (3).

Because $C'_P/C'_S = RRF_{S/P}/(A'_S/A'_P)$ according to the formula (3), a reaction rate Pr can be calculated by the following formula (4) with the use of $C'_P/C'_S = RRF_{S/P}/(A'_S/A'_P)$.

$$\begin{aligned}Pr &= C'_P/(C'_S + C'_P) \\ &= (C'_P/C'_S)/(1 + C'_P/C'_S) \\ &= (RRF_{S/P}/(A'_S/A'_P))/(1 + RRF_{S/P}/(A'_S/A'_P))\end{aligned} \tag{4}$$

Similarly, the number of reaction products is n (n is an integer that is equal to or larger than 1) in the following description. Letting each concentration of the reaction products P1, P2, . . . Pk . . . , Pn in a sample be $C'_{P1}, C'_{P2}, \ldots C'_{Pk} \ldots C'_{Pn}$, a rate (reaction rate) at which an evaluation compound S has become any one of reaction products P1, P2, . . . Pk . . . , Pn with respect to the evaluation compound S is defined by the following formula (5).

$$Pr = (C'_{P1} + C'_{P2} + \ldots + C'_{Pk} + \ldots + C'_{Pn})/(C'_S + C'_{P1} + C'_{P2} + \ldots + C'_{Pk} + \ldots + C'_{Pn}) \tag{5}$$

Detected intensities of the reaction products P1, P2, . . . Pk . . . , Pn are respectively $A'_{P1}, A'_{P2}, \ldots A'_{Pk} \ldots A'_{Pn}$, and relative response factors of an evaluation compound S with respect to the respective reaction products P1, P2, . . . Pk . . . , Pn are respectively $RRF_{S/P1}, RRF_{S/P2}, \ldots RRF_{S/Pk} \ldots RRF_{S/Pn}$. In this case, a reaction rate Pr is expressed by the following formula (A) by calculation similar to that of the formula (4). The formula (A) includes the case expressed by the formula (4).

$$\begin{aligned}Pr = &(RRF_{S/P1}/(A'_S/A'_{P1}) + RRF_{S/P2}/(A'_S/A'_{P2}) + \ldots \\ &RRF_{S/Pk}/(A'_S/A'_{Pk}) + \ldots RRF_{S/Pn}/(A'_S/A'_{Pn}))/(1 + \\ &RRF_{S/P1}/(A'_S/A'_{P1}) + RRF_{S/P2}/(A'_S/A'_{P2}) + \ldots \\ &RRF_{S/Pk}/(A'_S/A'_{Pk}) + \ldots RRF_{S/Pn}/(A'_S/A'_{Pn}))\end{aligned} \tag{A}$$

As being understood from the fact that the formula (A) is based on a ratio between detected intensities of an evaluation compound and each reaction product, it is not necessary to create a calibration curve or the like to quantitatively analyze an absolute concentration of an evaluation compound or a reaction product, and a concentration does not have to be known when the evaluation compound is introduced into the analysis device 1. Further, even in a case where a relative response factor of the analysis device 1 has not been measured in the past, a reaction rate can be calculated with the use of a relative response factor that is obtained in the past in an analysis device that is considered to have a substantially equal relative response factor. This can further reduce the number of operations. As an example of analysis devices that are considered to have equal relative response factors include analysis devices of the same model, the same manufacturer, etc.

The rate calculator 522 calculates a reaction rate using the formula (A). The rate calculator 522 calculates rates $A'_{P1}, A'_{P2}, \ldots A'_{Pk} \ldots A'_{Pn}$ between the evaluation compound S and the respective reaction products P1, P2, . . . Pk . . . , Pn. The rate calculator 522 substitutes these calculated rates in the formula (A) and calculates a reaction rate. In a case where being displayed in percentage, a reaction rate may be multiplied by 100. A calculated reaction rate is stored in the storage 43.

The determiner 523 determines whether the analysis device 1 is in a suitable state for an analysis based on the calculated reaction rate. The determiner 523 makes reference to the above-mentioned determination threshold value stored in the storage 43 or the like and determines whether a calculated reaction rate is smaller than the threshold value (hereinafter referred to as reaction rate determination). The above-mentioned determination threshold value is suitably set in advance to a value of 4% of a value of a past measurement example, a theoretical value or the like.

The output controller 53 produces an output image including information or the like representing a result of reaction rate determination obtained by a process executed by the data processor 52, and controls the outputter 44 and causes the outputter 44 to output the output image.

In a case where the analysis device 1 is not in a suitable state for an analysis as a result of reaction rate determination, the notifier 530 of the output controller 53 outputs a notification to inform the user that the analysis device 1 is not in a suitable state for an analysis. For example, in a case where it is determined that the analysis device 1 is not in a suitable state for an analysis as a result of reaction rate determination performed by the determiner 523, the notifier 530 can cause the outputter 44 to output characters such as "Sample is likely to be decomposed," "Fail," "May not be able to perform an accurate analysis," etc. and provides warning. While a method of displaying such warning is not limited in particular, warning may be displayed as a pop-up message in a screen, for example. Further, the notifier 530 may cause the outputter 44 to output a message to prompt re-calibration of a device such as auto-tuning of sensitivity of a voltage of the ion adjuster 34, the mass separator 35 or the like, or calibration of an m/z value, or a message indicating that consumables need to be replaced, etc. Even in a case where it is determined that the analysis device 1 is in a suitable state for an analysis as a result of reaction rate determination, the notifier 530 may cause the outputter 44 to output characters such as "PASS," etc.

(Regarding Analysis Method)

Figure 3:
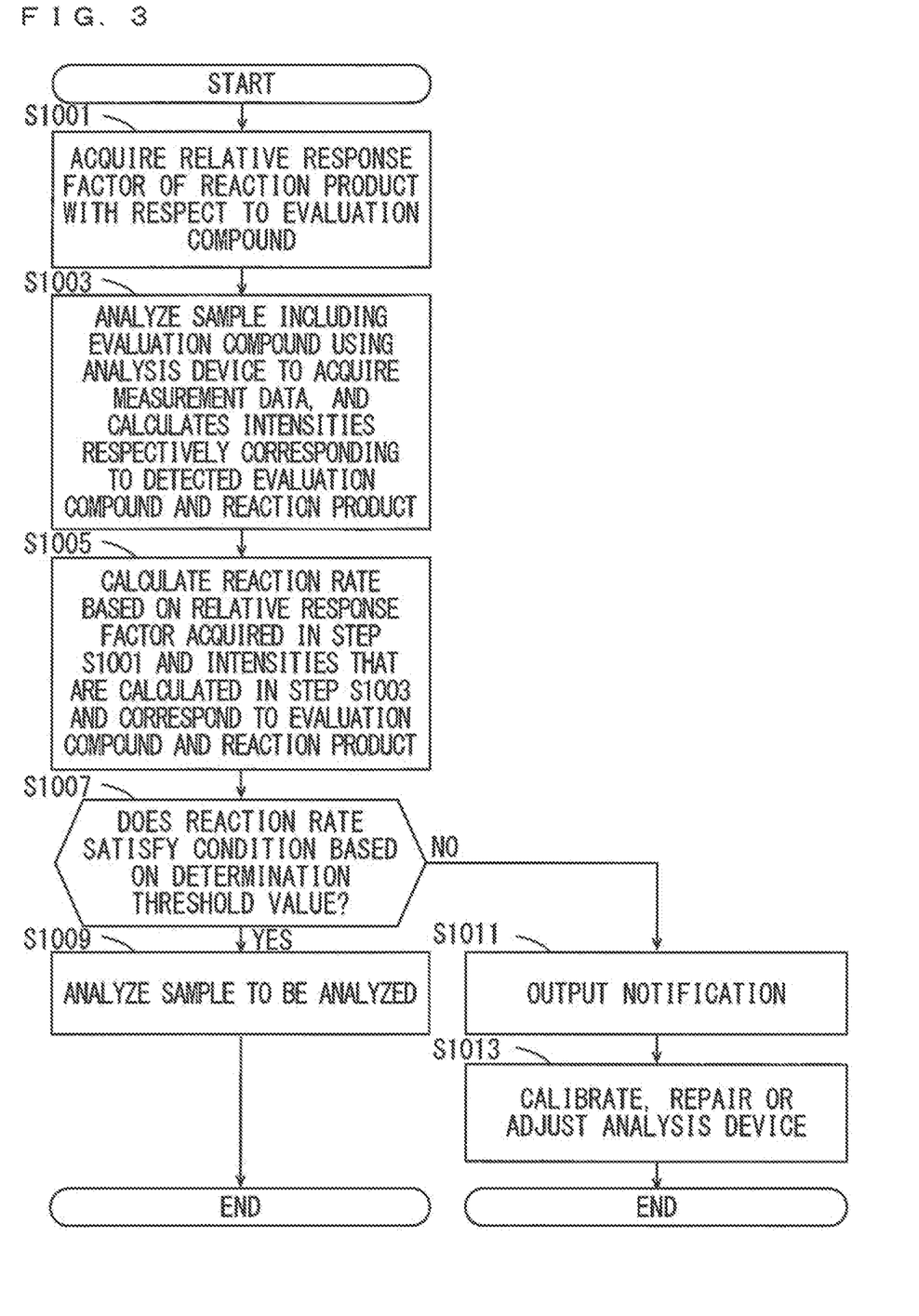
FIG. 3 is a flowchart showing a flow of an analysis method according to the one embodiment.

FIG. 3 is a flowchart showing a flow of the analysis method according to the present embodiment. In the step S1001, the information processor 40 acquires each relative response factor of at least one reaction product with respect to an evaluation compound. A relative response factor is acquired via the inputter 41 or the communicator 42 and stored in the storage 43. When the step S1001 ends, the step S1003 is started. In the step S1003, a sample including an evaluation compound is analyzed by the analysis device 1, the information processor 40 acquires measurement data, and the intensity calculator 521 calculates intensities respectively corresponding to a detected evaluation compound and at least one reaction product. When the step S1003 ends, the step S1005 is started.

In the step S1005, the rate calculator 522 calculates a reaction rate based on each relative response factor acquired in the step S1001 and the intensities respectively corresponding to the evaluation compound and the at least one reaction product that are calculated in the step S1003. When the step S1005 ends, the step S1007 is started. In the step S1007, the determiner 523 determines whether the reaction rate satisfies a condition based on a determination threshold value. In a case where the reaction rate is smaller than the determination threshold value, the determiner 523 makes affirmative determination of the step S1007, and the step S1009 is started. In a case where the reaction rate is equal to or larger than the determination threshold value, the determiner 523 makes negative determination of the step S1007, and the step S1011 is started.

In the step S1009, the analysis device 1 performs an analysis of a sample to be analyzed. The information obtained by this analysis is output from the outputter 44 or the like. When the step S1009 ends, the process ends.

In the step S1011, the notifier 530 causes the outputter 44 to output a notification indicating that the analysis device 1 is not in a suitable state for an analysis. When the step S1011 ends, the step S1013 is started. In the step S1013, the device controller 51 controls the measurer 100 and calibrates the analysis device 1, and the user repairs or adjusts the analysis device 1. When the step S1013 ends, the process ends.

With the above-mentioned embodiment, the following effects are obtained.

(1) In a method of evaluating an analysis device or the analysis device 1 of the present embodiment, the measurer 100 introduces a sample including an evaluation compound into the analysis device 1 for measurement and detects the evaluation compound and at least one reaction product derived from the evaluation compound, and the data processor 52 acquires information representing whether the analysis device 1 is in a suitable state for an analysis based on an intensity of the detected evaluation compound and an intensity of each of the detected at least one reaction product, and a relative response factor in regard to each of the evaluation compound and the at least one reaction product. Thus, whether the analysis device 1 is in a suitable state for an analysis can be evaluated without a complicated operation.

(2) In the method of evaluating an analysis device of the present invention, the above-mentioned information is acquired based on a ratio between the intensity of the detected evaluation compound and the intensity of each of the detected at least one reaction product, and the above-mentioned relative response factor. Thus, it is possible to perform the above-mentioned evaluation without depending on an amount of an evaluation compound to be introduced. Further, in the present embodiment, a "rate" refers to the relationship represented by A:B, B:A or A/B, B/A or the like between two parties A, B and includes a "ratio" (A/B).

(3) In the method of evaluating an analysis device of the present embodiment, a reaction rate that is a proportion in which the evaluation compound has been changed to the reaction product is calculated based on the intensity of the evaluation compound and the intensity of each of the at least one reaction product, and the above-mentioned relative response factor. Thus, an index in regard to whether the analysis device 1 is in a suitable state for an analysis can be indicated by a numerical value, and comparison using numerical values, etc. can be performed.

(4) In the method of evaluating an analysis device of the present embodiment, the information representing whether the analysis device 1 is in a suitable state for an analysis is acquired based on whether the reaction rate satisfies a condition based on a determination threshold value. Thus, the above-mentioned evaluation can be performed more objectively with the use of the determination threshold value.

(5) In the method of evaluating an analysis device of the present embodiment, the reaction rate Pr is expressed by the above-mentioned formula (A). Thus, the above-mentioned evaluation can be performed quantitatively.

(6) The method of evaluating an analysis device of the present invention includes outputting a notification in a case where the analysis device 1 is at least not in a suitable state for an analysis. Thus, the user can be informed of information about the analysis device 1 in a comprehensible manner.

(7) In the method of evaluating an analysis device of the present embodiment, an absolute concentration of the evaluation compound or the reaction product does not have to be quantitatively analyzed or is not quantitatively analyzed. Therefore, it is not necessary to create a calibration curve in regard to an evaluation compound and a reaction product, and the number of operations can be reduced.

An absolute concentration of an evaluation compound or a reaction product may be quantitatively analyzed.

(8) In the method of evaluating an analysis device of the present embodiment, the analysis device 1 includes at least one of a mass spectrometer and a chromatograph. Because an introduced compound may be decomposed by contamination or deterioration in these devices, the present invention can be suitably applied.

(9) In the method of evaluating an analysis device of the present embodiment, the analysis device 1 is a gas chromatograph-mass spectrometer, a pyrolysis gas chromatograph-mass spectrometer, a gas chromatograph, a liquid chromatograph, a liquid chromatograph-mass spectrometer or an ion attachment mass spectrometer. Because decomposition of an introduced compound due to contamination or deterioration is observed more noticeably in these devices, the present invention can be more suitably applied.

(10) A method of calibrating an analysis device of the present embodiment includes evaluating the analysis device 1 by the above-mentioned method of evaluating the analysis device 1, and calibrating the analysis device 1 based on the evaluation. Thus, the number of complicated operations can be reduced, and the analysis device 1 can be calibrated efficiently.

(11) An analysis method according to the present embodiment includes evaluating the analysis device 1 by the above-mentioned method of evaluating an analysis device, and performing an analysis using the evaluated analysis device 1. Thus, the number of complicated operations can be reduced, and an analysis can be performed efficiently.

Following modifications is in the scope of the present invention and can be combined with the above-mentioned embodiment. In the below-mentioned modified example, parts having structure and functions similar to those of the above-mentioned embodiment are denoted with the same reference numerals, and a description will suitably be not repeated.

Modified Example 1

In the above-mentioned embodiment, when an analysis of a sample to be analyzed is performed by the analysis device 1, a value obtained in the analysis may be corrected with the use of a reaction rate. For example, suppose that the rate calculator 522 calculates a reaction rate with Deca-BDE as an evaluation compound and Nona-BDE as a reaction product, and then an analysis is performed in a case where Deca-BDE and Nona-BDE are to be analyzed. In this case, a detection amount of Deca-BDE obtained in the analysis can be corrected based on the proportion of decomposition of Deca-BDE indicated by the reaction rate. Further, a detection amount of Nona-BDE obtained in the analysis can be corrected based on the proportion of production of Nona-BDE indicated by the reaction rate.

With the analysis method of the present modified example, measurement data obtained by the analysis device 1 is corrected based on information representing whether the analysis device 1 is in a suitable state for an analysis. Thus, more accurate measurement data can be provided based on the evaluation of the analysis device 1.

Modified Example 2

Figure 4:
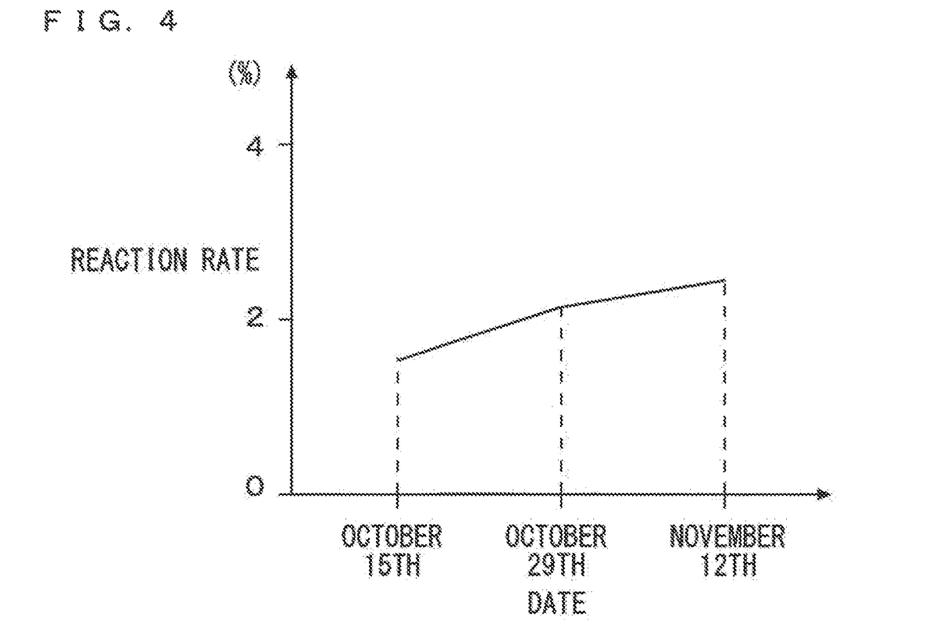
FIG. 4 is a graph showing a change of a reaction rate over time.

In the above-mentioned embodiment, in a case where the method of evaluating an analysis device of the above-mentioned embodiment is performed multiple times in regard to the analysis device 1, the data processor 52 can produce data corresponding to a graph representing a change of a calculated reaction rate over time. The output controller 53 can cause the outputter 44 to output an output image showing the graph.

FIG. 4 is a diagram showing one example of a graph showing a change of a reaction rate over time. The abscissa indicates the acquisition time of data by dates, and the ordinate indicates a reaction rate. Time interval indicated by the abscissa or numerical values indicated by the ordinate can be suitably set.

With a method of evaluating an analysis device of a present modified example, the graph representing a change of a reaction rate over time is displayed. Thus, in regard to a period corresponding to the graph, the user can be informed of information about whether the analysis device 1 is in a suitable state for an analysis in a comprehensible manner.

Modified Example 3

A program for implementing an information processing function of the analysis device 1 may be recorded in a computer-readable recording medium. A computer system may read the program, which is recorded in this recording medium, in regard to the control of a process of data processor 52 and its related processes, described above, and execute the program. A "computer system" here includes hardware such as an OS (Operating System) or peripheral appliances. Further, a "computer-readable recording medium" refers to a movable recording medium such as a flexible disc, an optical magnetic disc, an optical disc or a memory card and a storage device such as a hard disc built into a computer system. Further, a "computer-readable recording medium" may include an object that retains a program movably for a short period of time such as a communication wire that is used when a program is transmitted through a network such as the Internet or a communication line such as a telephone line, and an object that retains a program for a certain period of time such as a volatile memory in a computer system that serves as a server or a client. Further, the above-mentioned program may be to implement part of the above-mentioned functions, and may further be to implement the above-mentioned functions by being combined with an already recorded program.

Figure 5:
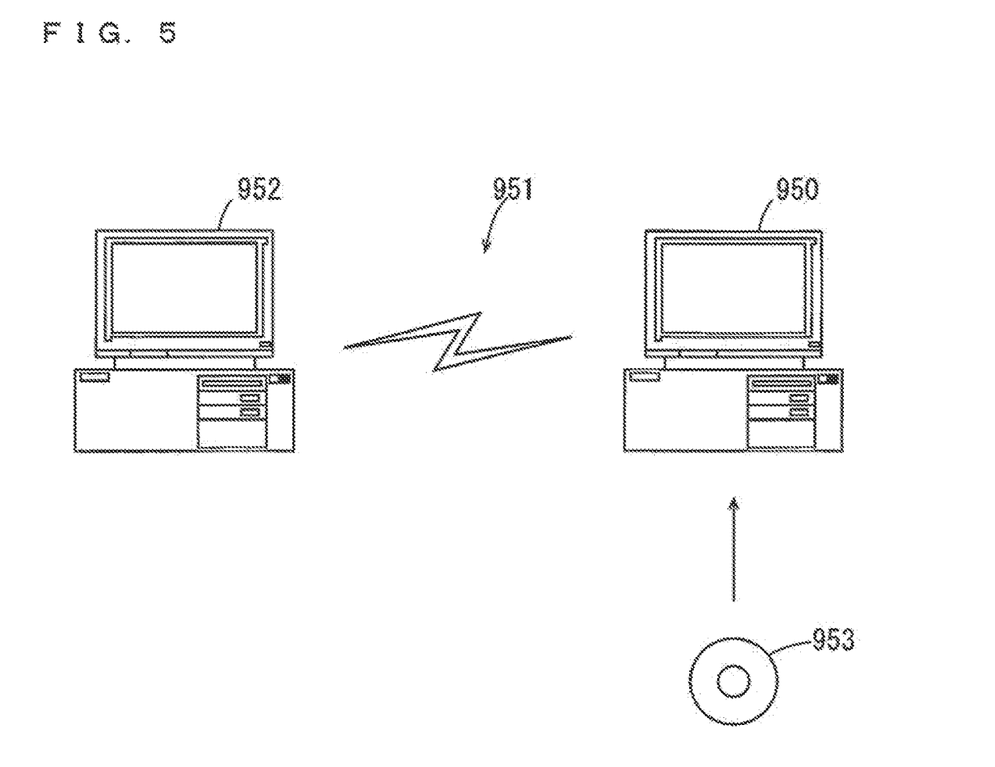
FIG. 5 is a conceptual diagram for explaining a program.

Further, in a case where being applied to a personal computer (hereinafter referred to as a PC), the program relating to the above-mentioned control can be provided via a recording medium such as a CD-ROM or a DVD-ROM, or a data signal such as the Internet. FIG. 5 is a diagram showing the appearance. A PC 950 receives a program via a CD-ROM 953. Further, the PC 950 has a function to be connected to a communication line 951. A computer 952 is a server computer that provides the above-mentioned program, and stores a program in a recording medium such as a hard disc. The communication line 951 is a communication line such as the Internet or a personal computer communication, or a dedicated communication line. The computer 952 reads a program with the use of the hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

A program for implementing the above-mentioned information processing function is to cause a processing device including a computer or the like to execute a measurement data acquisition process (corresponding to the step S1003 in the flowchart of FIG. 3) of introducing a sample including an evaluation compound into an analysis device that is capable of detecting each of a plurality of compounds included in the sample for measurement and acquiring measurement data obtained by detection of the evaluation compound and at least one reaction product derived from the evaluation compound, and a device information acquisition process (corresponding to S1005) of acquiring information representing whether the analysis device 1 is in a suitable state for an analysis based on an intensity of the detected evaluation compound and an intensity of each of the detected at least one reaction product, and a relative response factor in regard to each of the evaluation compound and the at least one reaction product. Thus, evaluation in regard to whether the analysis device 1 is in a suitable state for an analysis can be realized without a complicated operation.

The present invention is not limited to the contents of the above-mentioned embodiment. Other embodiments are possible without departing from the spirit and scope of the present invention.

REFERENCE SIGNS LIST

1 . . . Analysis device, 10 . . . Gas chromatograph, 12 . . . Sample introducer, 14 . . . Separation column, 30 . . . Mass Spectrometry Unit, 33 . . . Ionizer, 35 . . . Mass separator, 36 . . . Detector, 40 . . . Information processor, 44 . . . Outputter, 50 . . . Controller, 52 . . . Data processor, 100 . . . Measurer, 521 . . . Intensity calculator, 522 . . . Rate calculator, 523 . . . Determiner, 530 . . . Notifier, In . . . Ions

The invention claimed is:

1. A method of evaluating an analysis device that is capable of detecting each of a plurality of compounds included in a sample, including:
 introducing the sample including a first compound into the analysis device for measurement and detecting the first compound and at least one reaction product derived from the first compound; and
 acquiring information representing whether the analysis device is in a suitable state for an analysis based on an intensity of the detected first compound and an intensity of each of the detected at least one reaction product, and a relative response factor in regard to each of the first compound and the at least one reaction product.

2. The method of evaluating an analysis device according to claim 1, wherein
 the information is acquired based on a ratio between the intensity of the detected first compound and the intensity of each of the detected at least one reaction product, and the relative response factor.

3. The method of evaluating an analysis device according to claim 1, wherein
 a proportion in which the first compound has been changed to the reaction product is calculated based on the intensity of the first compound and the intensity of each of the at least one reaction product, and the relative response factor.

4. The method of evaluating an analysis device according to claim 3, wherein
 the information representing whether the analysis device is in a suitable state for an analysis is acquired based on whether the proportion satisfies a condition based on a predetermined threshold value.

5. The method of evaluating an analysis device according to claim 3, including displaying a graph showing a change of the proportion over time.

6. The method of evaluating an analysis device according to claim 3, wherein
 letting an intensity of the first compound be A's, letting an intensity of a k-th reaction product be $A'_{Pk}$ in a case where n is the number of types of a reaction product and k is a natural number (k is an integer that is equal to or larger than 1 and equal to or smaller than n) and letting a relative response factor of the first compound with respect to the k-th reaction product be $RRF_{S/Pk}$, the proportion (Pr) is expressed by a following formula (A)

$$Pr = (RRF_{S/P1}(A'_S/A'_{P1}) + RRF_{S/P2}(A'_S/A'_{P2}) + \ldots RRF_{S/Pk}(A'_S/A'_{Pk}) + \ldots RRF_{S/Pn}(A'_S/A'_{Pn}))/(1 + RRF_{S/P1}(A'_S/A'_{P1}) + RRF_{S/P2}(A'_S/A'_{P2}) + \ldots RRF_{S/Pk}(A'_S/A'_{Pk}) + \ldots RRF_{S/Pn}(A'_S/A'_{Pn})) \quad \text{the formula (A)}$$

7. The method of evaluating an analysis device according to claim 1, including outputting a notification in a case where the analysis device is at least not in a suitable state for an analysis.

8. The method of evaluating an analysis device according to claim 1, wherein
 an absolute concentration of the first compound or the reaction product is not quantitatively analyzed.

9. The method of evaluating an analysis device according to claim 1, wherein
 the analysis device includes at least one of a mass spectrometer and a chromatograph.

10. The method of evaluating an analysis device according to claim 9, wherein
 the analysis device is a gas chromatograph-mass spectrometer, a pyrolysis gas chromatograph-mass spectrometer, a gas chromatograph, a liquid chromatograph, a liquid chromatograph-mass spectrometer or an ion attachment mass spectrometer.

11. A method of calibrating an analysis device including:
 evaluating an analysis device by the method of evaluating an analysis device according to claim 1, and
 calibrating the analysis device based on the evaluation.

12. An analysis method including:
 evaluating an analysis device by the method of evaluating an analysis device according to claim 1; and
 performing an analysis using the evaluated analysis device.

13. The analysis method according to claim 12, wherein, data obtained by the analysis device is corrected based on the information.

14. An analysis device that is capable of detecting each of a plurality of compounds included in a sample, comprising:
 a measurer that introduces the sample including a first compound into the analysis device for measurement and detects the first compound and at least one reaction product derived from the first compound; and
 a device information acquirer that acquires information representing whether the analysis device is in a suitable state for an analysis based on an intensity of the detected first compound and an intensity of each of the detected at least one reaction product, and a relative response factor in regard to each of the first compound and the at least one reaction product.

15. A non-transitory computer readable medium storing a program for causing a processing device to execute:

a measurement data acquisition process of introducing a sample including a first compound into an analysis device that is capable of detecting each of a plurality of compounds included in the sample for measurement and acquiring measurement data obtained by detection of the first compound and at least one reaction product derived from the first compound; and a device information acquisition process of acquiring information representing whether the analysis device is in a suitable state for an analysis based on an intensity of the detected first compound and an intensity of each of the detected at least one reaction product, and a relative response factor in regard to each of the first compound and the at least one reaction product.

* * * * *